United States Patent [19]

Payne

[11] Patent Number: 4,823,999

[45] Date of Patent: Apr. 25, 1989

[54] LADDER RACK

[76] Inventor: Earl E. Payne, R.D. #2, Box 411, Blairsville, Pa. 15717

[21] Appl. No.: 107,493

[22] Filed: Oct. 8, 1987

[51] Int. Cl.⁴ .............................................. B60R 9/00
[52] U.S. Cl. ..................................... 224/309; 224/323
[58] Field of Search ............... 224/310, 309, 318, 323, 224/325; 182/127

[56] References Cited

U.S. PATENT DOCUMENTS

| | | | |
|---|---|---|---|
| 2,782,973 | 2/1957 | Lang | 224/323 |
| 3,251,519 | 4/1965 | Jones | 224/42.1 |
| 3,672,612 | 6/1972 | Laing, Jr. | 248/361 R |
| 3,722,766 | 3/1973 | Barrineau et al. | 224/42.1 F |
| 3,826,390 | 7/1974 | Watson | 214/450 |
| 3,888,398 | 6/1975 | Payne | 224/42.1 |
| 3,963,136 | 6/1976 | Spanke | 224/310 |
| 4,008,838 | 2/1977 | Correll | 224/42.1 F |
| 4,170,331 | 10/1979 | Faulstich | 224/324 |
| 4,239,138 | 12/1980 | Kowalski | 224/325 |
| 4,269,340 | 5/1981 | Kowalski et al. | 224/325 |
| 4,618,083 | 10/1986 | Weger, Jr. | 224/324 |

FOREIGN PATENT DOCUMENTS 90431 5/1966 France ............................ 224/309

Primary Examiner—Renee S. Luebke
Attorney, Agent, or Firm—Nils H. Ljungman

[57] ABSTRACT

A ladder rack for retaining ladders thereon within the confines of supporting surfaces provided by structural support elements which are enclosed at least partially by selectively renewable wear or cushion elements which present wear surface portions for sliding, abutting or general supporting engagement with ladders carried by the ladder rack.

9 Claims, 1 Drawing Sheet

LADDER RACK

BACKGROUND OF THE INVENTION

1. Field of the Invention

This invention pertains to a rack upon which ladders may be secured for transport thereof from one location to another. As such, the rack is adapted to be mounted on a vehicle such as the roof of a car or van.

2. Description of the Prior Art

The art is replete with examples of roof racks for ladders and the like. For example, U.S. Pat. Nos. 3,251,519, 4,618,083 and 3,826,390 disclose roof racks for securing a ladder or ladders to the roof of a vehicle for transport thereof. Although these and many other prior art ladder racks generally have served their intended purpose, there has remained a need for improved simplicity, structural integrity, and economy of manufacture for such racks. In addition, new techniques in the design and construction of ladders has revealed a need for improved ladder racks. For example, the recent advent of fiberglass ladders has contributed to such need. Fiberglass ladders must be handled more carefully than conventional wood or aluminum ladders, and can be easily damaged by mishandling.

The above-mentioned patents are incorporated herein by reference as if the entire contents thereof were fully set forth herein.

SUMMARY OF THE INVENTION

The invention herein pertains to a novel and improved ladder rack which is greatly simplified as to design and structure, is most economical to manufacture, and is especially well adapted for carrying modern fiberglass ladders, although it can, of course carry conventional ladders as well.

The invention contemplates a fabricated, rigid frame suitably dimensioned to receive and retain a ladder or ladders thereon, and including ladder retention locks or latches which are operable to secure the ladders The novel ladder rack further includes a wear or cushioning surface which overlies those portions of the rigid frame that can come into contact with a ladder or ladders during placement of ladders on the rack, transport, and removal of ladders from the rack. The wear surface preferably may be provided in the form of an elongated hollow element having an opening extending continuously throughout the longitudinal extent thereof, such that the wear element may be selectively installed upon even those elements of the rigid frame which have no free ends, for example, elongated cross members of the frame which are secured to other portions of the frame at both of their longitudinal ends.

One aspect of the invention resides broadly in a ladder rack comprised of an assembly of structural elements configured to support and retain ladders thereon by way of a plurality of ladder supporting elements arranged to confine and support such ladders with respect to the ladder rack. The improvement comprises at least some of the supporting elements, which comprise respective elongated rigid structural elements, each at least partially encompassed by a selectively renewable wear element such that engagement between such ladders and the at least some of the supporting elements is confined to engagement of such ladders with surface portions of the renewable wear elements.

Another aspect of the invention resides broadly in a ladder rack for retaining and transporting ladders. The ladder rack comprises a rigid structural frame including structural support elements adapted to support such ladders thereon and upright elements carried by the frame and projecting upwardly thereof to confine such supported ladders laterally with respect to the frame. The support and upright elements include selectively renewable wear elements structurally supported by support and upright elements to provide rigid load bearing wear surfaces for support of such ladders. The wear elements are renewable by selective removal of the wear elements from their corresponding structural support and upright elements, and by replacement thereof by installation of another wear element on its corresponding structural support and upright elements.

Yet another aspect of the invention resides broadly in a ladder rack for retaining and transporting fiberglass ladders on a vehicle The ladder rack comprises a rigid structural frame including structural support elements adapted to support such fiberglass ladders thereon, and upright elements carried by the frame and projecting upwardly thereof to confine such supported ladders laterally with respect to the frame. The support and upright elements includes stationary cushioning elements structurally supported by the support and upright elements to provide stationary load bearing cushioned surface elements for support of such fiberglass ladders, whereby damage to such fiberglass ladders is minimized when such ladders are carried by the ladder rack.

OBJECTS OF THE INVENTION

Accordingly, it is one object of this invention to provide a novel and improved ladder rack such as for use in transporting ladders atop a motor vehicle.

It is a further object of the invention to provide a novel ladder rack structure of improved structural integrity, simplicity, economy of manufacture, and versatility as to the types of ladders which it may carry.

A more specific object of the invention is to provide a ladder rack having ladder contact and support surfaces comprised of wear elements having exterior surfaces which contact the ladders carried by the ladder rack in supporting engagement therewith, and which wear elements are in turn supported by structural elements of the ladder rack that are at least partially encompassed by the wear element for selectively releasable retention of the wear element with respect to the respective ladder rack structural elements.

These and other objects and further advantages of the invention will be more readily appreciated upon consideration of the following detailed description and the accompanying drawings.

DESCRIPTION OF THE PREFERRED EMBODIMENTS

Figure 1:
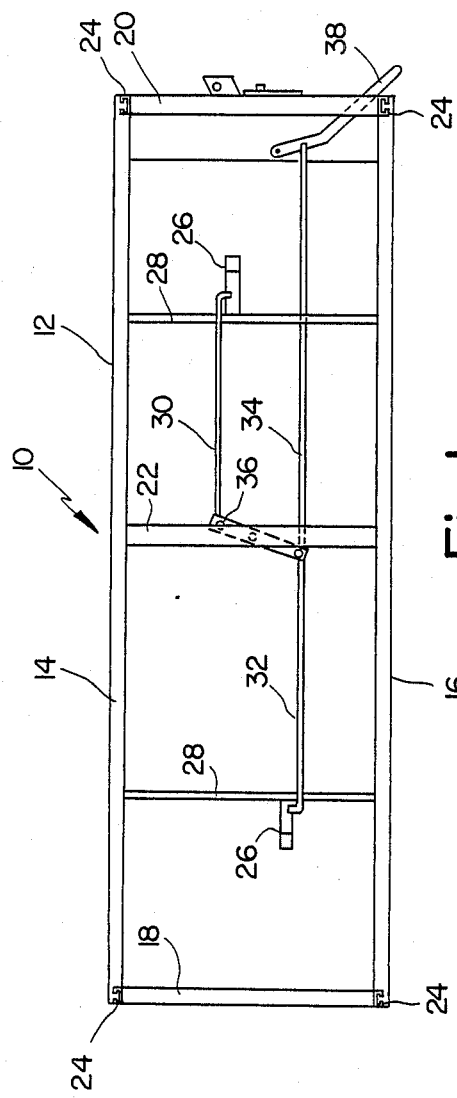
FIG. 1 is a top plan view of a ladder rack according to the instant invention.

There is generally indicated at 10 in FIG. 1, a ladder rack constructed according to one presently preferred embodiment of the instant invention, and comprising the best mode of the invention contemplated at this time. Rack 10 comprises an elongated structural frame 12 having a pair of longitudinally extending side elements 14 and 16, which are maintained in parallel relationship by a pair of cross members 18 and 20 located to extend between respective transversely spaced opposite ends of members 14 and 16, and an intermediate cross member 22 extending similarly between members 14 and 16 approximately midway between the opposed longitudinal ends thereof All of the structural members described hereinabove may preferably be rigid metal members such as elongated C-section steel channel, and may be welded together in the structural configuration described to provide the rigid frame 12 in the form of an open rectangle.

Adjacent each corner of the rectangular frame 12 there is provided an upright member 24 which may likewise be fabricated from a steel channel section of predetermined length, and which is welded adjacent one end thereof to the respective corner portion of frame 12 in upstanding relationship therewith. Preferably, the open side of the C-channel section of each corner upright 24 faces outwardly with respect to frame 12. Of course, other uprights may be provided as desired, for example, adjacent to the juncture between cross member 22 and the respective side members 14 and 16.

Ancillary features of the rack 10 include a pair of ladder clamps 26 mounted on respective transversely extending pivot axis members 28 whose opposite ends are pivotally retained by the respective side members 14 and 16. A system of operating links 30, 32 and 34 connects pivotal clamps 26, through a crank element 36, to an operating member such as a pivotal handle 38, to provide selective manipulation of clamps 26 between respective ladder retention and release the positions to retain a ladder or ladders in proper position upon rack 10 with the ladders extending longitudinally of frame 12 intermediate the side members 14 and 16. The ladders are thus supported on cross members 18, 20 and 22 intermediate the respective laterally spaced pairs of upright elements 24.

Figure 2:
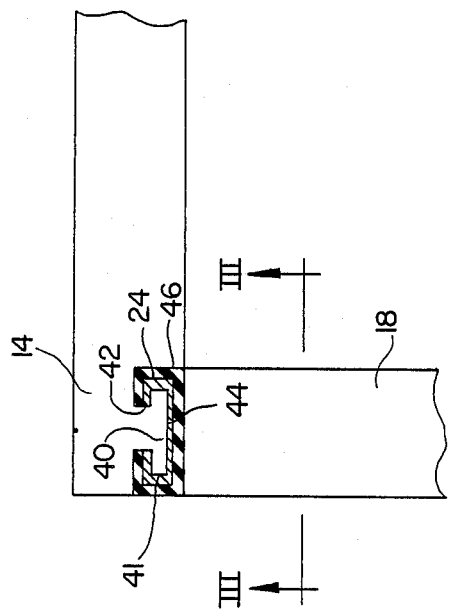
FIG. 2 is a fragmentary portion of FIG. 1 showing an upright structural element of the ladder rack in section.

In FIG. 2, there is shown a fragmentary portion of frame 12, specifically, the corner where the side member 14 is joined to cross member 18 as by welding, for example. As may be seen, one of the upright elements 24 also is secured adjacent the corner formed by members 14 and 18 as by welds 40, so as to project upwardly of members 14 and 18 in rigidly retained relationship therewith. The upright 24 is comprised of a length of C-channel steel 41 having the open side 42 thereof preferably opening outwardly or away from the area between the opposed ends of the cross member 18 where ladders are received and retained on rack 10. Accordingly, during loading, transport or unloading of ladders, the ladders are supported by the opposed or closed side 44 of the C-channel member 41.

In order to prevent progressive damage to ladders due to repeated loading and unloading, and to jostling of the ladders during transport, the closed side 44 of C-channel member 41 is covered by a wear or cushioning element 46 of molded or extruded or otherwise formed plastic material such as polyurethane or nylon, for example, and is preferably ultra high molecular weight polyethylene made by FPI Industries Inc., P.O. Box 14160, Pittsburgh, Pa. 15239, and designated by them as UHMW. The wear elements cover all latch surfaces that a ladder can contact during loading, transport, and unloading. The wear elements protect and cushion shocks and abrasion upon the fiberglass ladders which are loaded in and transported by the rack. Preferably, the wear element 46 substantially completely encompasses C-channel member 41 so as to be retained in interlocking engagement thereon during normal use of the ladder rack 10. Wear element 46 may be thus retained in engagement on C-channel member 41 by a slight spring bias or interference fit between the elements, or such other suitable means as may prove desirable. However, the mechanism of retention preferably is one which permits selective removal of wear element 46 for replacement thereof when excessively worn over long term use of the ladder rack 10. In the case of a friction fit of wear element 46, it may be renewed by merely slipping the worn element off the free end 48 of upright 24, and replacing it with a new wear element 46 in the same manner. Alternatively, material that it may be peeled away from C-channel member 41, and replaced with a new wear element 46 in the same manner.

Figure 3:
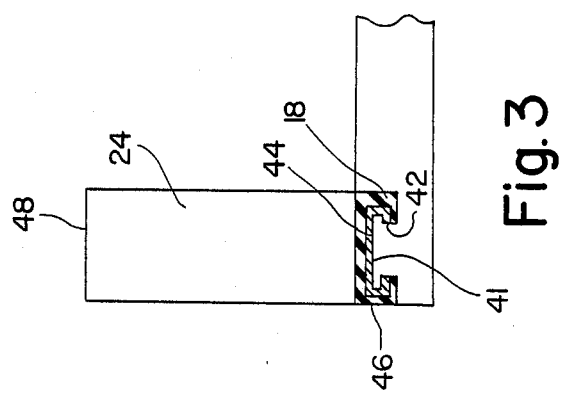
FIG. 3 is a sectional view taken on line III—III of FIG. 2.

In the showing of FIG. 3, it will be seen that cross member 18 also is comprised of a C-channel section 41 having the open side 42 thereof facing down and the closed side 44 thereof facing up, such that, again, ladders carried by rack 10 typically are supported on the upwardly facing portion of the corresponding wear element 46 which extends adjacent closed side portion 44 of the C-channel element.

It will be noted that because the cross member 18 has no free end, it is not possible to replace wear element 46 thereon by sliding the same off of one end. Accordingly, at least for cross members 18, 20 and 22, the wear elements 46 carried thereby must be of suitable flexibility to permit installation and removal thereof by deforming the wear elements 46 sufficiently to wrap them laterally about the respective cross members. For any of the wear elements 46, whose removal may be achieved by peeling the worn element 46 away from the structural member on which it is mounted, the element 46 may be retained by adhesive bonding thereof to the respective structural member, with the adhesive bond being preferably readily broken during the peeling-off operation.

From the above description, it will be seen that the instant invention accords an improved and simplified ladder rack of highly simplified structure, wherein all surfaces of the rack, which come into contact with ladders during loading, transport and unloading of the ladders, are provided by renewable wear elements of suitable plastic or elastomer material which is retained in its desired position and given structural strength by an underlying structural element, about which the wear element extends in at least partially encompassing relationship. The rack of this invention thus engages and supports ladders by sliding or abutting contact only. It neither utilizes nor requires any rollers or similar moving parts to guide the ladders being loaded, unloaded, or carried thereon. Of course, the plastic or elastomeric wear elements are of such suitable material, with regard to the sliding engagement thereof with the fiberglass ladders, to ensure that such sliding contact will not substantially harm the fiberglass ladders in any way. By contrast, it has been found that conventional ladder racks will rapidly wear and damage fiberglass ladders if such sliding contact occurs repeatedly; hence the proposals for use of expensive guide roller and other structural expedients in the prior art.

The C-channel structural elements provide exceptional structural strength with minimal material cost, although if cost is not regarded as so crucial a factor as the weight of the frame, the C-channel elements may be channel sections of aluminum, for example. In addition, the specific form of the channel sections may be varied within a latitude of design options consistent with the purposes and strength requirements of the ladder rack; the specific form and material of wear elements 46 also may be chosen from a latitude of design options consistent with the requirements above specified, and of course, the specific dimensions or proportions, ladder retention mechanism, and the like may be varied as well.

As I have contemplated these and various other alternative and modified embodiments of the invention, it is my intent that the invention be construed as broadly as permitted by the scope of the claims appended hereto.

What is claimed is:

1. A ladder rack for retaining and transporting fiberglass ladders on a vehicle, said ladder rack comprising:
    a rigid structural frame including cross members to support such fiberglass ladders thereon; and
    upright elements carried by said frame and projecting upwardly thereof to confine such supported ladders laterally with respect to said frame;
    said cross members and said upright elements including stationary cushioning means structurally supported by said cross member and said upright elements to provide stationary plastic load bearing cushioned surface means comprising plastic sheaths at least partially surrounding said cross members and said upright elements for support of such fiberglass ladders, whereby damage to such fiberglass ladders is minimized when such ladders are carried by said ladder rack; and
    locking means for holding such supported fiberglass ladders on said rack wherein said locking means comprises at least one clamp or gripping rungs of a ladder.

2. The ladder rack according to claim 1, wherein said support and upright elements include elongated metal channel section elements.

3. The ladder rack according to claim 1, wherein said cushioning means conform generally to the cross sectional geometry of said support and upright elements.

4. The ladder rack according to claim 1, wherein said support and upright elements include integral retention means for retaining the respective said cushioning means with respect thereto.

5. The ladder rack according to claim 1, wherein said plastic sheaths comprise polyethylene.

6. The ladder rack according to claim 5, wherein said polyethylene comprises ultra high molecular weight polyethylene.

7. The ladder rack according to the claim 5, wherein at least some of said support and upright elements include elongated C-section elements.

8. The ladder rack according to claim 1, wherein at least some of said support and upright elements include elongated C-section elements.

9. The ladder rack according the claim 8, wherein said cushioning means is of a geometry to at least partially encompass said structural support and upright elements.

* * * * *